(12) United States Patent (10) Patent No.: US 7,747,633 B2
Kadiyska et al. (45) Date of Patent: Jun. 29, 2010

(54) INCREMENTAL PARSING OF HIERARCHICAL FILES

(75) Inventors: Yana D. Kadiyska, Seattle, WA (US); Anton V. Lapounov, Kirkland, WA (US); Sergey Dubinets, Bellevue, WA (US); Christopher J. Lovett, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 359 days.

(21) Appl. No.: 11/781,636

(22) Filed: Jul. 23, 2007

(65) Prior Publication Data

US 2009/0030921 A1 Jan. 29, 2009

(51) Int. Cl.
*G06F 17/30* (2006.01)

(52) U.S. Cl. .................................... 707/755; 707/999.2

(58) Field of Classification Search .......... 707/999.001, 707/999.1, 999.2
See application file for complete search history.

(56) References Cited

U.S. PATENT DOCUMENTS

| | | | |
|---|---|---|---|
| 6,904,562 B1 | 6/2005 | Hind et al. |
| 7,065,561 B2 | 6/2006 | Fry et al. |
| 7,080,094 B2 | 7/2006 | Dapp et al. |
| 2003/0046317 A1 | 3/2003 | Cseri et al. |
| 2004/0006741 A1 | 1/2004 | Radja et al. |
| 2004/0205082 A1 | 10/2004 | Fontoura et al. |
| 2004/0205509 A1 | 10/2004 | Lou |

2006/0117307 A1 6/2006 Averbuch et al.

OTHER PUBLICATIONS

Ramanath et al., IMAX: Incremental Maintenance of Schema-based XML Statistics, VLDB, 2004, pp. 1-12.*
Warren X. Li, Building Efficient Incremental LL Parser by Augmenting LL Table and Threading Parse Tree, ACM, 1995, pp. 269-270.*
Kim et al., Fast Updatable Indexing Scheme for Structured XML Documents, Springer-Verlag, 2003, pp. 207-217.*
Papakonstantinou, et al., Incremental Validation of XML Documents:, http://db.ucsd.edu/publications/incremental_validation.pdf, Lasted accessed on Jul. 23, 2007, 14 pages.
Barbosa, et al., "Efficient Incremental Validation of XML Documents", http://www.cs.utoronto.ca/~marenas/ publications/icde04.pdf, MArcelo Arena, University of Toronto, Last accessed on Jul. 23, 2007, 12 pages.
Bohannon, et al., "Incremental Evaluation of Schema-Directed XML Publishing", http://delivery.acm.org/10.1145/1010000/1007625/p503-bohannon.pdf?key1=1007625&key2=8212319711&coll=GUIDE&dl=GUIDE&CFID=22383635&CFTOKEN=72627742, SIGMOD 2004, Jun. 1318, 2004, Paris, France.

* cited by examiner

*Primary Examiner*—Fred I Ehichioya
(74) *Attorney, Agent, or Firm*—Turocy & Watson, LLP

(57) ABSTRACT

An incremental parser for hierarchical files is provided where the file can be parsed into a tree representation. Changes to the file can effectuate incremental changes to the tree such that the whole hierarchical file need not be reparsed; the incremental change modifies the necessary portions of the tree, not necessarily the entire tree. Moreover, the incremental parser can intelligently handle errors related to modification of the hierarchical file, such as unmatched tags corresponding to unmatched nodes in the tree. Such error handling provides operability with the malformed hierarchical file rather than providing an error and/or rejecting the file as modified.

16 Claims, 10 Drawing Sheets

INCREMENTAL PARSING OF HIERARCHICAL FILES

BACKGROUND

The evolution of computers and networking technologies from high-cost, low performance data processing systems to low cost, high-performance communication, problem solving, and entertainment systems has provided a cost-effective and time saving means to lessen the burden of performing every day tasks such as correspondence, bill paying, shopping, budgeting information and gathering, etc. For example, a computing system interfaced to the Internet, by way of wire or wireless technology, can provide a user with a channel for nearly instantaneous access to a wealth of information from a repository of web sites and servers located around the world. Such a system, as well, allows a user to not only gather information, but also to provide information to disparate sources. As such, online data storing and management has become increasingly popular.

In light of such data storing, hierarchical languages for storing data have been developed to facilitate intuitively organizing the data as compared to relational data stores, for example. While relational data stores are typically high performance, hierarchical files, such as extensible markup language (XML) files, can become more difficult to handle. One reason is that XML files are typically loaded entirely into memory before querying can occur. Once in memory, however, querying can be as fast as the processor of the system can handle. Due to this, the cost of loading the XML file in memory (such as on startup) is outweighed by the structure of the data and easily operability in programming languages, for example. However, where applications allow modification of an XML or other hierarchical file, reloading and parsing the entire file in memory again is time-consuming, especially for frequent modification.

Moreover, large XML or other hierarchical files can become fragile as they grow such that direct edits to the file can result in breaking the file. For example, the file can comprise many tokens indicating hierarchical structure—the tokens can correspond to open and close (or start and end) tags. Neglecting to include a tag, or deleting such a tag without replacing it, can occur often; however, these operations typically "break" the file, such that parser will not/cannot completely parse the broken file until the file is restored to a proper structure. This can hinder development especially where the errors and/or forgotten tags are minor in nature.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

An incremental hierarchical file parser is provided to create a hierarchical tree representation of the file (and/or hierarchical data string) where the parser can process updates made to the file directly into the tree. In this regard, the updates can occur incrementally to a minimum number of nodes in the tree affected by the update in the file/string. Thus, the entire tree need not be reloaded. Additionally, errors in the tree can be intelligently handled so as not to break the tree; for example, a mismatched end-tag in the file/string can be appended to the nearest open start-tag such to continue parsing the tree. This can be especially useful when incrementally parsing an update on a file/string to a tree as the update can in some cases challenge the integrity of the tree. Due to operator and/or machine error, tags can be mismatched due to not taking the entire structure of the tree into account when updating. Such errors can be handled to have minimal effect, if any, on tree parsing.

In one embodiment, the hierarchical file/data string can relate to an XML document having a plurality of nested start and end tags. A hierarchical tree can be created corresponding to the XML document along with a position tree, for example. An update to the XML document can be detected along with a position of a last unaffected node before the update and a first unaffected node after the update. The positions of these nodes can be resolved by the position tree (such as through binary search, for example). The update can be processed on the hierarchical tree according to the nodes corresponding to the positions. For example, in a delete operation, the appropriate nodes corresponding to the positions can be deleted along with nodes in the range. An insertion can yield nodes being inserted at the node corresponding to the first position, and a modification can be a delete followed by an insert according to this scheme, for example. Thus, the subject matter as described can incrementally process updates to a hierarchical file and propagate the updates to a tree representation and do so while intelligently handling errors both existing at the time of the update as well as errors occurring as a result of the update. To this end, the tree can be reparsed at substantially any time during update of the hierarchical data (e.g. it does not have to wait for the full update to occur) as it can render an operable tree at each step; the tree is substantially the same tree that would result from a full reparse of the hierarchical file at the given point in time.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

An incremental hierarchical file parser is provided to facilitate creating a tree representation of the hierarchical file; the parser can create the tree for incorrectly formatted files as well to allow tree generation where minor (or major) errors occur. In one embodiment, the hierarchical file can be an extensible markup language (XML) file, for example. XML files can be large such that parsing the file requires much processing to the point of becoming burdensome (especially where the resulting tree is used in subsequent programs or tools). Additionally, because of the nature of XML files, inserting text into an XML document can often cause the document to become malformed, for example, where the editor of the file (human or machine, for example) does not take external effects of the addition/deletion of text into account. Thus, the advantages of the subject matter as described herein are at least two-fold; one advantage is to provide incremental parsing of the XML file such that additions to the file do not require reparsing of the entire XML tree as this can be burdensome, and another is to parse the additions to intelligently handle errors that result from the additions.

In one embodiment, an XML file, for example, can be read and parsed into a plurality of tokens; the tokens can correspond to nodes on a tree representative of the XML file. This initial parse can occur after the file is created and/or loaded for subsequent use (such as in a project relating to application development, for example). The XML file can subsequently be changed to add, delete, and/or modify a portion of the XML file. The incremental parser can detect the point in file where change(s) have occurred and change the relevant portions of the representative tree accordingly, thus mitigating the need to reload the entire XML file. In this regard, the parser can determine the smallest number of nodes that need to be touched in the tree. Moreover, if the modification to the XML file has rendered the file improperly formatted, the incremental parser can continue updating the tree according to an algorithm that can overlook the error, in a sense. Thus, the rendered tree is substantially similar to the tree that would be created by reloading the entire tree into memory.

Various aspects of the subject disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
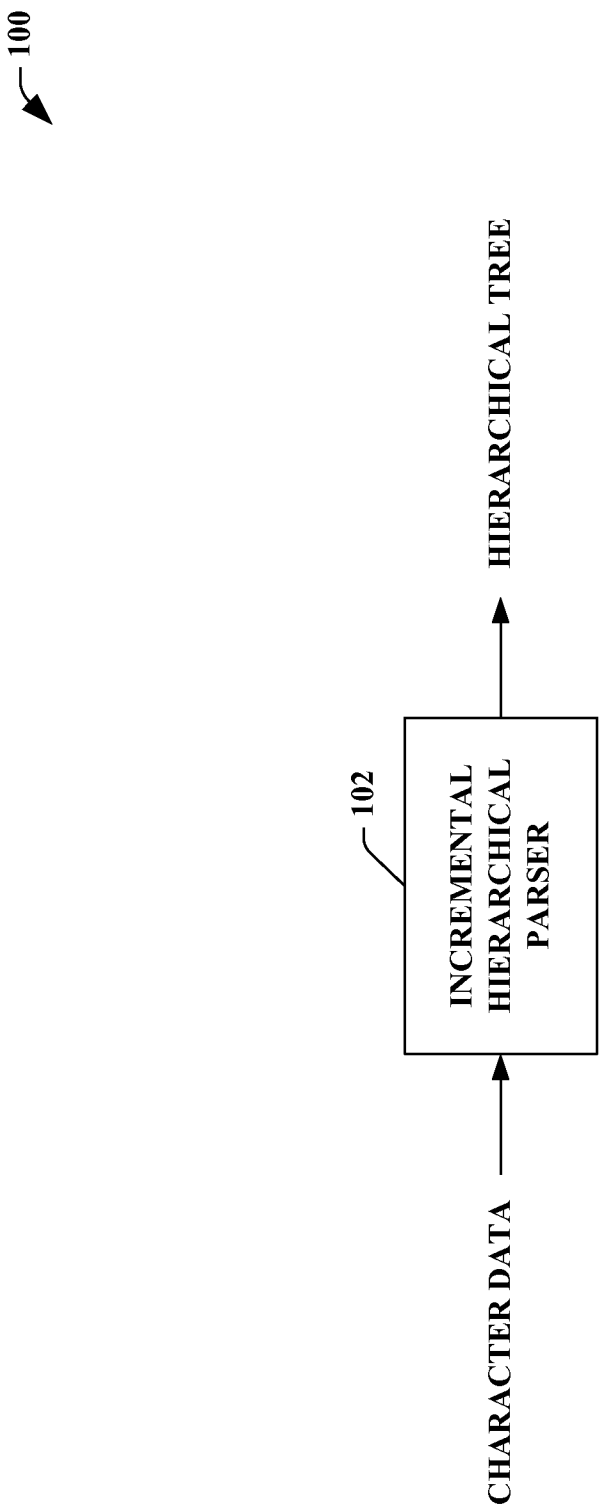
FIG. 1 illustrates a block diagram of an exemplary system that facilitates parsing hierarchical data into a tree.

Now turning to the figures, FIG. 1 illustrates a system 100 that facilitates incrementally parsing a hierarchically formatted character string. An incremental hierarchical parser 102 is provided that can parse the character string into a representative hierarchical tree. In one embodiment, character data (such as alphanumeric and/or ASCII data) can be input into the incremental hierarchical parser 102, and a resulting representative hierarchical tree can be produced. For example, the character string can relate to a new hierarchical structure, and a representative tree can be rendered by the incremental hierarchical parser 102. In another embodiment, the character string can relate to a string to be added to the original character string. It is to be appreciated that the string can be appended and/or added to substantially any position in the character string. Such an insertion can effectuate change in the structure of the representative tree; therefore, the incremental hierarchical parser 102 can change just the affected nodes in the tree structure.

In one embodiment, the character file can be an XML file, for example. Thus, the nodes of the representative graph can relate to tags, literals, values, etc. in the XML code, where embedded tags, literals, values, etc. are represented as children nodes to the nodes representing the tags in which they are embedded (or nested, for example). Adding text in the middle of the XML can result in change of text contents of a node, addition of nodes, deletion of nodes, modification of nodes, and/or the like. For this reason, a full reparse of the XML file has been thought beneficial to ensure the representative graph is accurate. However, use of XML files has become extremely versatile and some XML files can be extremely large in size and contents such that reparsing can become intensive. This can be so especially where the representative XML tree is used in conjunction with applications requiring near real-time updating. Thus, the incremental hierarchical parser 102 can provide accurate incremental updating of the tree according to the updates to the XML file. In one embodiment, the incremental hierarchical parser 102 can determine the last unaffected node in the file before the beginning of the modified portion of the file and also the first unaffected node after the end of the modified portion. The incremental hierarchical parser 102 can subsequently modify the tree between the two located nodes according to the parsing of the modified text. In this regard, the XML file, as incrementally reparsed, can produce the same tree as if the entire modified file was reparsed. It is to be appreciated that the subject matter described herein is not limited to XML; rather XML is used throughout to facilitate illustration of the aspects recited. For example, the file and representative tree can be related to substantially any hierarchy representative character string (such as a tab delimited file—e.g. an program application code listing), etc. Additionally, the subject matter is not limited to alphanumeric and/or ASCII data; rather binary (such as a picture/flow diagram, etc.) and other types of lexicographic representations can be utilized in conjunction with the subject matter described herein.

Figure 2:
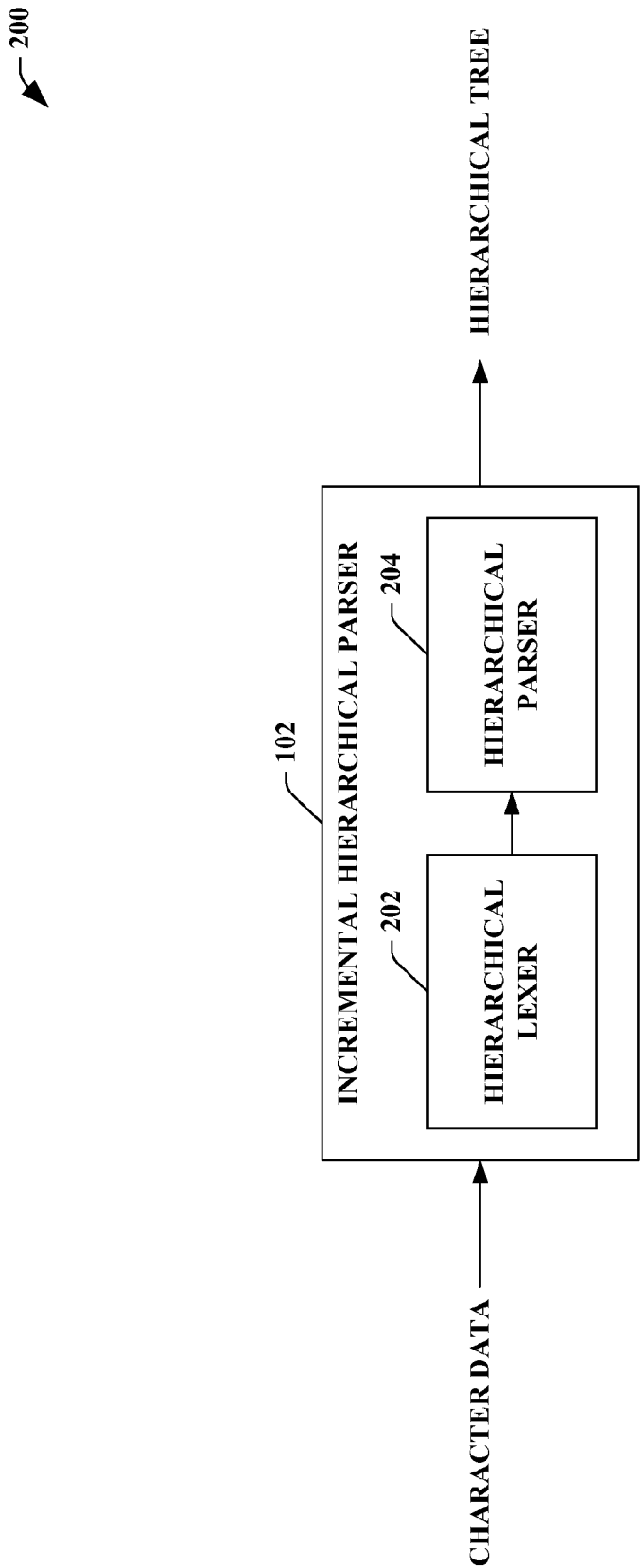
FIG. 2 illustrates a block diagram of an exemplary system that facilitates lexing and parsing hierarchical data into a tree.

Referring to FIG. 2, a system 200 for incrementally parsing a character string according to tokenized portions of the string is shown. An incremental hierarchical parser 102 is provided having a hierarchical lexer 202 for recognizing tokens in a character string and a hierarchical parser 204 that creates a representative hierarchical tree from the tokens. In one embodiment, the incremental hierarchical parser 102 can receive character data as input and pass the data onto the hierarchical lexer 202. The hierarchical lexer 202 can tokenize the string according to formatting rules, for example. The tokens are passed to the hierarchical parser 204 that can parse the tokens into a tree representing the hierarchical structure of the character data.

In one embodiment, the character data can be representative of XML data. The XML data is input into the hierarchical lexer 202 which can tokenize the XML data according to XML specification rules (such as those provided by the World Wide Web Consortium (W3C), for example). Additionally, the hierarchical lexer 202 can intelligently handle errors in format of the XML data (such as syntax errors). It is to be appreciated that the hierarchical parser 204 can additionally or alternatively handle such errors in the format of the XML tokens (such as logical and/or positional errors). Because of the size and complexity of some XML hierarchies, errors can be easily committed when adding text to an XML file, especially in the middle of the file. Thus, where parsers historically break and cease processing upon this occurrence, an incremental hierarchical parser 102 as described can be more strategic in processing the XML file. It is to be appreciated that this functionality can be implemented in the hierarchical lexer 202 and/or parser 204, for example. Examples will be described in greater detail infra.

For example, the XML string:

<Person><Name><First>John</First><Last>Smith</Last></Name></Person> can be tokenized into a plurality of tokens according to the XML language specification by the hierarchical lexer 202. For example, tokens can be created for start-tags, end-tags, empty element tags, comments, processing instructions, CDATA sections, text, white space, reference, and/or the like. In the foregoing example, the string can be sent to the incremental hierarchical parser 102 which can utilize the hierarchical lexer 202 to produce the following tokens: <Person>; <Name>; <First>; John; </First>; <Last>; Smith; </Last>; </Name>; </Person>. The hierarchical lexer 202 can additionally associate a parent node with the currently tokenized node to facilitate creating the XML tree. The hierarchical parser 204 can subsequently create a representative XML tree with nodes corresponding to the tokens. This can be done according to a set of rules as well (such as XML nesting rules in the XML example). The tree can begin with a virtual root node having child nodes for <Person> and </Person>. The <Person> node can then have children for <Name> and </Name>. The <Name> node can have children for <First>, </First>, <Last>, and </Last>. The <First> node has a child for John, and the <Last> node has a child for Smith. Thus, a representative XML tree can be created programmatically as well using the following pseudo-code.

```
var rootNode = new Node(NodeKind.Root);
var lastStartTag = rootNode;
foreach (var token in streamOfTokens) {
    var curNode = new Node(token);
    if (curNode.Kind == NodeKind.EndTag) {
        // Find the nearest ancestor start-tag with the same
        // name
        for (var startTag = lastStartTag; startTag != rootNode;
             startTag = startTag.ParentNode) {
            if (startTag.Name == curNode.Name) {
                lastStartTag = startTag.ParentNode;
                break;
            }
        }
    }
    lastStartTag.AppendChild(curNode);
    if (curNode.Kind == NodeKind.StartTag)
        lastStartTag = curNode;
}
```

It is to be appreciated that substantially any programming language can be utilized to implement the foregoing code. The code can create an in-memory representation of an XML tree, such as described herein, for subsequent programmatic access, for example. Additionally, the code is not limited to XML data; rather substantially any hierarchically formatted document that can be tokenized into hierarchical nodes can be utilized with the code.

Following the initial parse, the XML can be modified, which can cause an incremental parse and update of the representative tree. For example, the XML string can add "son" to John Smith's last name.

<Person><Name><First>John</First><Last>Smithson</Last></Name></Person>

The modification can be detected as occurring between the <Last> and </Last> nodes such that only children related to these nodes, the first unaffected and the last unaffected nodes in the modification, can require modification in the tree representation. In one embodiment, the <Last> Smithson</Last> string can be read by the hierarchical lexer 202 to tokenize the string into <Last>, Smithson, and </Last> tokens. The hierarchal parser 204 can, then, locate the <Last> node in the tree and replace the Smith node with the new Smithson node. Alternatively, the parser 204 can locate <Last> and delete all children nodes (which is only Smith in the old tree) and add the new nodes (Smithson, in this example). Thus, a portion of the tree is modified, and the resulting tree is substantially the same as if the entire tree was parsed anew.

Figure 3:
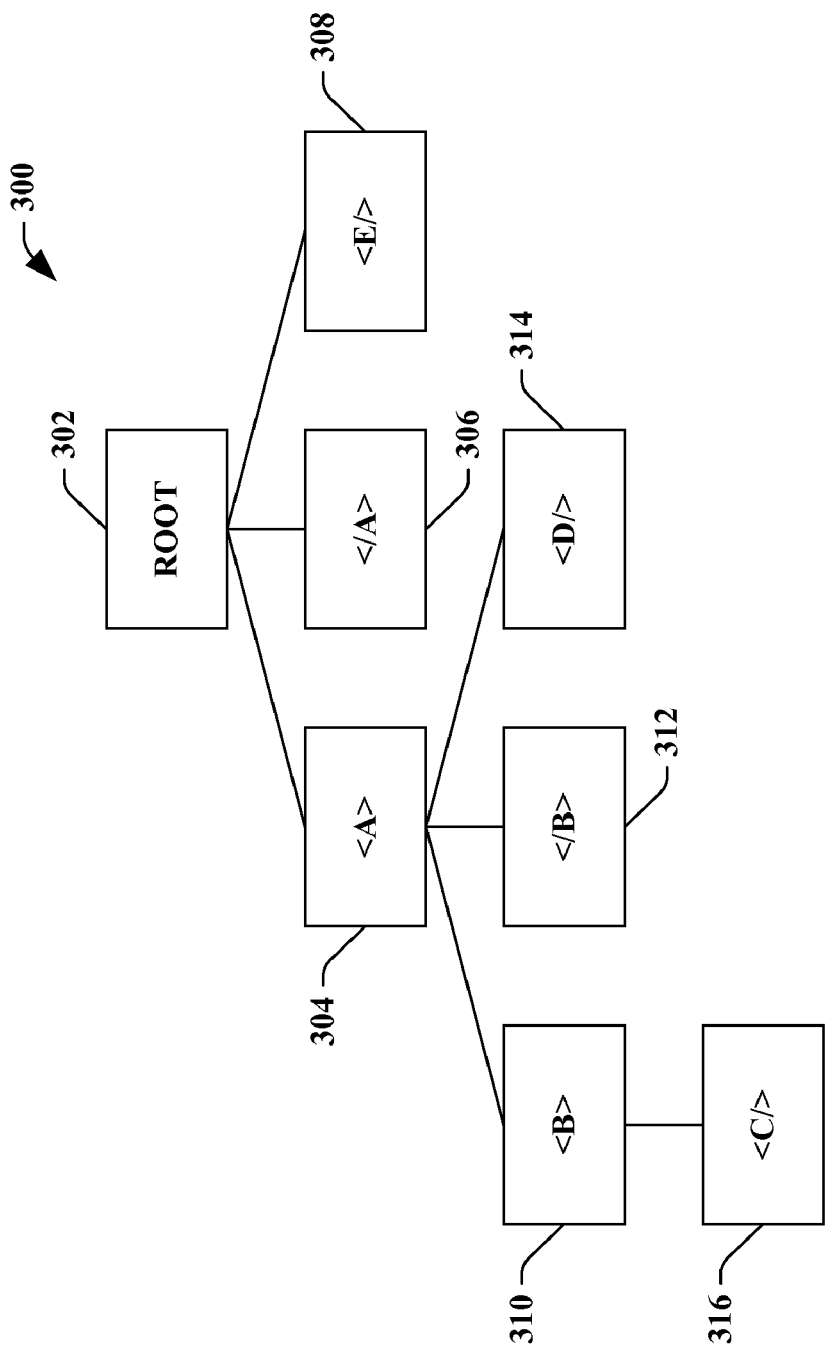
FIG. 3 illustrates a block diagram of an exemplary hierarchical tree related to a hierarchical data string.

Turning now to FIG. 3, an example XML tree 300 as described in previous figures is illustrated. The tree 300 comprises a plurality of nodes for tokens of an XML document linked together in a representative hierarchy. For example, this tree can relate to the XML string <A><B><C/></B><D/></A><E/>.

As shown, there is a root node 302 having children <A> 304, </A> 306, and <E/> 308. Moreover, <A> 304 has children <B> 310, </B> 312, and <D/> 314; <B> 310 has child <C> 316. The tree can be parsed in this regard by an incremental hierarchical parser as shown in previous figures, for example, to represent the XML string. In one embodiment, the tree can also be represented by a string (in memory, for example), such as $A[B[C^*]\overline{B}D^*]\overline{A}E^*$, where the symbol X denotes a start-tag <X>, $\overline{X}$ denotes an end-tag </X>, X* denotes an empty element tag, and the square brackets denote nesting of elements. The string can be the result of parsing by a hierarchical parser as shown in previous figures, for example. As previously mentioned, the subject matter described herein can intelligently recover from formatting errors in XML; such errors are common in a language such as XML since multiple characters are required for a token, and often nodes are added without looking at previous nodes. Additionally, while tab delimiting in XML files is desirable, it can have errors also causing errors in subsequent addition of XML code. There can be a number of ways to handle such errors. For example, <A><B></A></B> can be parsed as the string $A[B]\overline{AB}$ or $A[B\overline{AB}]$. In one embodiment, the subject matter as described can associate a mismatched end-tag </X> with the nearest ancestor start-tag with the same name <X>. If there is no such start-tag, the mismatched end-tag </X> is left unmatched and appended as the last child of the last unclosed start-tag node. The pseudo-code provided above implements this algorithm as well. Thus, in the foregoing example, the subject matter as described can choose the former string $A[B]\overline{AB}$. As another example, a string with a mismatched end-tag having no start tag, such as <A><B></C></B> can be parsed as $A[B[\overline{C}]\overline{B}]$. Moreover, a start-tag missing an end-tag can also be accepted, for example. In this case, all nodes following the start-tag can be child nodes of the start tag node until a parent end-tag is reached. For example, <A><B><C/><E><F/></E></A><D/> can be parsed as $A[B[C^*E[F]\overline{E}]]\overline{A}D^*$. Thus, the subject matter as described can intelligently handle malformed XML documents to mitigate breaking the document and rendering such unusable due to mere errors.

Figure 4:
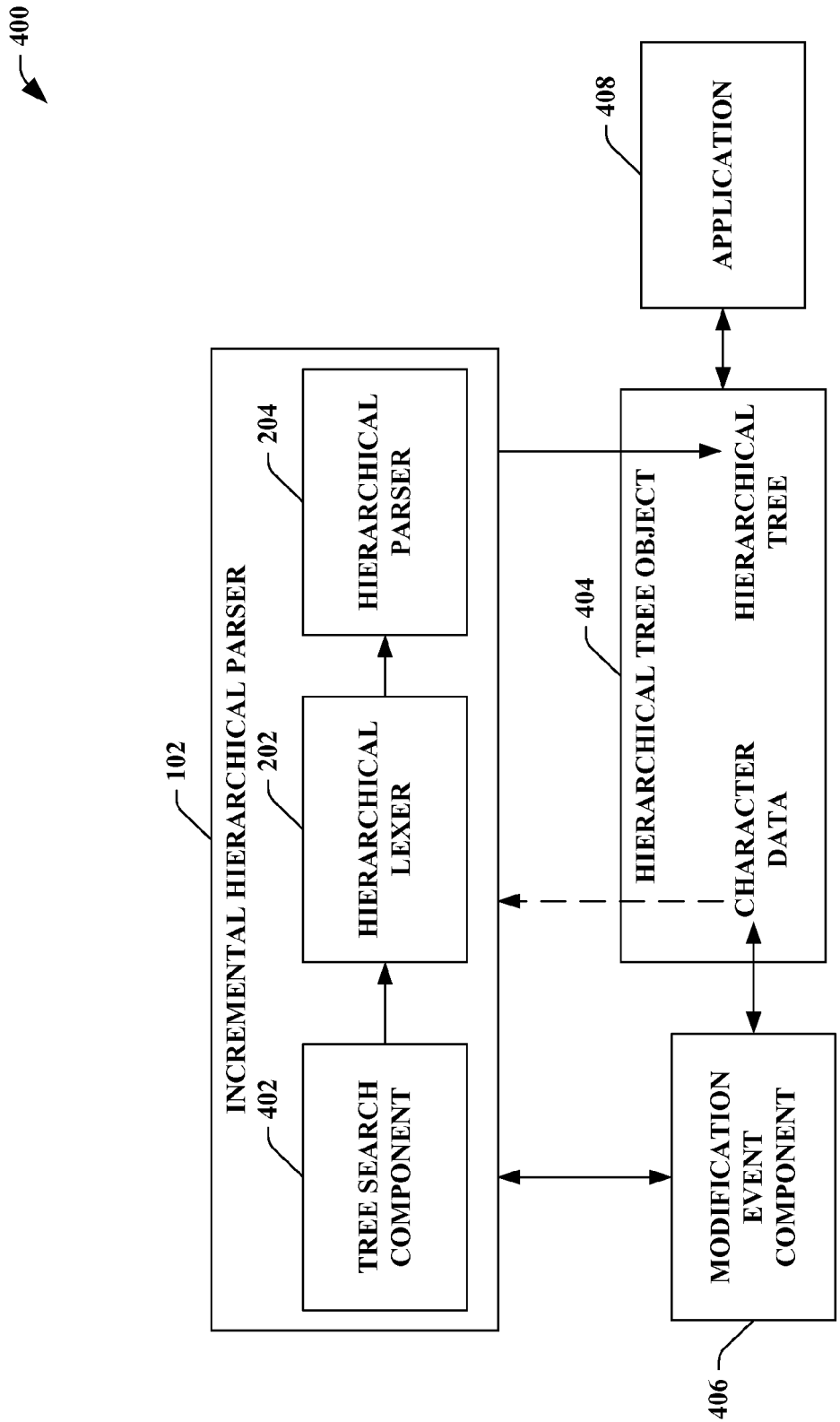
FIG. 4 illustrates a block diagram of an exemplary system that facilitates incrementally updating tree according to an update to a hierarchical data string.

Turning now to FIG. 4, an example system 400 for parsing incremental additions to a hierarchical file is displayed. An incremental hierarchical parser 102 is provided having a hierarchical lexer 202 for tokenizing strings of a hierarchically formatted text string, a hierarchical parser 204 for creating a hierarchical tree from the tokens, and a tree search component 402 that can search a hierarchical tree representation (and/or a second representation thereof, such as a position identification tree) for nodes related to an incremental addition. Additionally, a hierarchical tree object 404 is provided having character data represented in a hierarchy and a related hierarchical tree. It is to be appreciated that this object 404 can be stored in a computer memory, for example. Moreover, a modification event component 406 is provided that can detect a change to the character data and communicate information of the change to the tree search component 402. Additionally, an application 408 is provided that can utilize the hierarchical tree in the hierarchical tree object 404 to perform one or more tasks.

In one embodiment, an initial parse can take place where a hierarchical tree object 404 is created having a character string of hierarchically represented text. For example, the text can be an XML string, file, and/or document, or substantially any other hierarchically formatted string, file, and/or document (such as program application code, tab delimited file, etc.). The character data can be sent to the incremental hierarchical parser 102 for parsing thereof, shown as the dotted line in this figure. For example, the data can be requested by the incremental hierarchical parser 102, sent to the parser 104 by the hierarchical tree object 404, sent on behalf of a request from application 408, detected as a new character data string by the modification event component 406, etc. The hierarchical lexer 202 can read the data and formulate tokens corresponding to the data in accordance with a language specification, for example. In one embodiment, the language specification can be XML and the hierarchical lexer 202 formulates the string into tokens according to the XML specification as shown in examples above. Additionally, it is to be appreciated that the hierarchical lexer 202 can intelligently handle errors in the syntax of the XML—for example if an '=' is forgotten in a CDATA section.

The tokens produced by the hierarchical lexer 202 can be sent to a hierarchical parser 204 that creates a hierarchical tree from the tokens and can store the tree within the hierarchical tree object 404; it is to be appreciated that the tree can be provided to the hierarchical tree object 404 as a pointer to memory belonging to the incremental hierarchical parser 102 and/or the hierarchical parser 202 portion as well, etc. The hierarchical tree can comprise a plurality of nodes linked hierarchically, for example, as described in previous figures; additionally or alternatively, substantially any representation of the tree can be provided, such as the representative strings described in reference to FIG. 3. Moreover, the hierarchical parser 204 and/or another component of the incremental hierarchical parser 102 can create other local representations of the tree, such as a positional representation that comprises a plurality of nodes relating to the tokens in the string as well as their respective locations in the string. Such a tree can be utilized to facilitate incremental parsing as described herein. It is to be appreciated that positional information can be built into the hierarchical tree which can mitigate the need for the position tree, for example.

In another embodiment, the tree has been created and the hierarchical tree in the hierarchical tree object 404 exists as a plurality of nodes linked corresponding to the hierarchical content and structure of the character data stored in the object 404. The creation of the tree, for example, can happen in substantially the same manner as described above (initiation of which can be indicated by the dotted line in FIG. 4). In this embodiment, a change can be made to the character data, such as addition, deletion, and/or modification of one or more elements. This can be a text edit, for example. The modification event component 406 can detect the change in the character data of the hierarchical tree object 404 and send details regarding the modification to the tree search component 402. The details can include, for example, a starting position and/or a span of the text edit. For instance, an addition of text can specify the start position and/or the string added. A delete can specify a start position and/or a length/end position, and a modification can specify a start position, an end position, and/or the new string. It is to be appreciated that a modification can essentially be a multi-step delete and addition as well—delete from start position to end position and then add/insert new string at the start position. Also, the modification event component 406 can specify positions and the incremental hierarchical parser 102 can interpret the character data according to the positions.

Utilizing the details, the tree search component 402 can search a position version of the tree, as described above, comprised of a plurality of nodes representing tokens in the character data and positional information stored with the node, for example. The search can be a binary search (or substantially any tree search algorithm) to locate the position of the token corresponding to the first unaffected node before the insertion, deletion, or modification according to the position information from the modification event component 406, for example. In an insertion or addition, for instance, the tree search component 402 can find the position of the last node token before the addition that is unaffected by the addition as well as the first node after the addition that is unaffected. The tree search component 402 can pass this information to the hierarchical lexer 202, which can read the character data from the positions received from the tree search component 402 and create one or more tokens related to the data. Subsequently, the tokens can be passed to the hierarchical parser 204, which can locate the last unaffected token and add the new tokens in the corresponding hierarchical tree. It is to be appreciated that the last unaffected node can be found at other steps in the process too, such as at the tree search component 402 and/or the hierarchical lexer 202. The tree is copied or a pointer thereto to the hierarchical tree object 404 for subsequent user (such as by an application 408, for example).

For instance, an XML string

<S><R><A>foo</A>-->bar</R></S><Z/> can be provided as character data in the hierarchical tree object 404 and passed to the hierarchical lexer 202 for an initial parse. The lexer 202 can, for example, tokenize the string according to the XML language specification, yielding the tag and value tokens

| <S> | <R> | <A> | foo | </A> | -->bar | </R> | </S> | <Z/> |

The hierarchical parser 204 can subsequently create an XML tree comprising nodes relating to the tokens and links connecting the nodes indicating hierarchy, such that for example, <R> has children <A>, </A>, and -->bar; and <A> has a child foo. Additionally, a virtual root node can be provided having <S>, <R>, </R>, </S>, and <Z/> children. The tree can subsequently be passed to the hierarchical tree object 404 for storage thereof, and/or a pointer can be provided to the tree where the incremental hierarchical parser 102 can have the tree as a local property, for instance. Additionally, another tree can be created indicating positional information within the character data for each tree node. In this example, the string "!-" can be inserted before "A" in the <A> tag (by a user or program/machine, for example), rendering the character data <S><R><!-A>foo</A>->bar</R></S><Z/>.

It is to be appreciated that the strings "<!-" and "->" indicate comments in the XML language.

In this example, the modification event component 406 can detect the addition of the string and/or receive an event notifying of the addition. In either case, the modification event component 406 gains positional information regarding the modification and can obtain information about the nature of the change (addition, deletion, and/or modification). It is to be appreciated that the modification can be detected and/or received as a deletion followed by an insertion (or addition) and/or vice versa. The positional information can be passed to the tree search component 402, which can utilize the position information to find the last unaffected node before the modification (in this case the insertion). This can be done via binary search (or the like) of a positional representation tree as described. In this example, the tree can have nodes relating to the tokens as well as their position(s) in the character data string. Thus, the tree, for the original string, can have a virtual root node with a child node for <S> with position 0, <R> with position 3, </R> with position 22, </S> with position 26, and <Z/> with position 30. Furthermore, <R> can have child nodes for <A> with position 6, </A> with position 12, and ->bar with position 16. Moreover, <A> can have a child node for foo with position 9. Thus, in this example, a binary search can be performed for position 7, which is the position for insertion of "!-" received from the modification event component 406, for example.

As an example, the search can begin at <S> and see that the position is 0, then move to </S> seeing the position is 26. The search continues under <S> since 26 is greater than 7. Arriving at <R>, having position 3, the search continues to </R> with position 22. As before, children of <R> can be searched next since 22 is greater than 7. The search continues for children of <R>, starting with <A> at position 6 and </A> at position 12. Since 7 is between 6 and 12, <A>'s children can be searched next. During this search, foo can be determined to have position 9. It can be determined at this point that <A> is affected by the change and the previous unaffected node would be a sibling, but since <A> is the first child, the <R> node is the last unaffected node before the insertion. It is to be appreciated that this inference could have been made earlier when <A>'s position was read as 6 and has a length of 3 (thus, <A> is affected by an insertion at position 7) as well. This information can be passed to the hierarchical lexer 202, which can begin to retokenize the character data starting at the last unaffected node before the insertion and continuing until it reaches the first node in the same state as it was in the previous tree representation. For example, the hierarchical lexer 202 can formulate the new character data as the tokens

| <R> | <!--A>foo</A>--> | bar | </R> |

In this example, the retokenizing begins at <R> as described above; the retokenizing continues until the hierarchical lexer 202 hits </R> and determines that token has not changed. At this point in this example insertion, the hierarchical lexer 202 can stop retokenizing as nothing has changed passed </R> (otherwise <R> would have changed as well). It is to be appreciated that the <S>, </S>, and <Z/> nodes were not touched by the lexer 202 since they were outside the bounds of the last unaffected node before the insertion and the first unaffected node after the insertion. The tokens can be passed to the hierarchical parser 204, which can modify the tree according to the token information. Thus, the current children of <R>, represented in the old tree and character string, are deleted for the two new nodes for tokens <!-A>foo</A>-> and bar. In this regard, the resulting tree is as if the entire character string had been reparsed. The tree can subsequently be copied over and/or repainted with respect to the hierarchical tree object 404, for example.

As another XML insertion example, the character data

<R>bar<A></A></R> can be initially provided to the hierarchical lexer 202. The lexer 202 can tokenize the string into the tokens

| <R> | bar | <A> | </A> | </R> | and the hierarchical parser 204 can parse the tokens into a tree structure having a virtual root node with children <R> and </R>. <R> can have children bar, <A> and </A>. An insertion can occur placing the string "<S>" between the <R> and bar, rendering the character data <R><S>bar<A></A></R>.

The modification event node 406 can detect the insertion (or receive notification of such, for example) at position 3. This information can be passed to the tree search component 402, which can search a positional representation tree to find the last unaffected node before the insertion. In this case, <R> is checked, which is at position 0, and then </R> can be checked which is greater than position 3 where the change occurs. Thus, <R>'s children can come next and since bar is at position 3, <R> can be determined to be the last unaffected node before the insertion. Thus, the retokenization by the hierarchical lexer 202 can begin at <R>.

At this point, the lexer 202 can retokenize as follows

| <R> | <S> | bar | <A> | </A> | </R> |

The hierarchical lexer 202 thus starts at <R> and retokenizes the new character data. Though the bar node is syntactically unchanged, the retokenization process cannot stop there as the bar node has been given a new parent, <S>. The same is true for the <A> and </A> nodes. Thus, the lexer 202 can stop retokenizing at </R> since it really is unchanged. The tokens can be given to the hierarchical parser 204, which can replace the children of <R> given in the previous character data with the new token structure. Thus, <R> is given new child <S>, and child <S> has children bar, <A>, and </A>. It is to be appreciated that this can occur as a replace where the children of <R> are actually deleted, or the children can just be moved to <S> and <S> made a child of <R>. Additionally, the XML character data in this example is now malformed as the <S> tag is provided with no end-tag. However, as described previously, the algorithm has made <S> a child of the nearest ancestor tag, <R>. Thus, the tree as incrementally parsed with the error is substantially the same as if it were reparsed from the entire malformed character data string.

Another example of incrementally parsing insertions into an XML character data string is where the insertion contains an end-tag that matches to a start tag. Thus, the string <A><B></B><C> can be represented by the single character string A[B$\overline{BC}$]. Causing insertion of a string <D><E></A></E> after <B>, for example, can cause a change in the structure of other nodes in the tree. For example, the resulting string can be <A><B><D><E></A></E></B><C>, which can be parsed as A[B[D[E]]]$\overline{AEBC}$. Thus, the new </A> matches the original <A> and according to methods described above, while <D> and <E> become children of <B>; </E>, </B>, and <C> become children of the virtual root node, along with <A>. In particular, </B> used to be a child of <A> but is changed by the </A> tag inserted. Thus, a reparse of the entire XML string would produce a tree corresponding to the single character parsed string, so the incremental parse can do this as well. Therefore, when the insertion occurs, this can be detected by the modification event component 406, for example, and positional and/or string information can be sent to the tree search component 402 regarding where the insertion occurs. This information can be passed to the hierarchical lexer 202, for example, that can re-tokenize the string from the insertion point to the end of the new data. The lexer 202 and/or the hierarchical parser 204 can locate the last unaffected node before the insertion. In this process, the lexer 202 and/or parser 204 can notice the new unmatched end-tag and try to match it with previous nodes. If a matching start-tag is found, the hierarchical parser 204 can begin reparsing from the start-tag. If no start-tag is found, as mentioned the unmatched end tag can become a child of the last start tag before it. It is to be appreciated that where more than one unmatched end-tag is present in the inserted string, the parsing can begin from the earliest matching start-tag.

Therefore, in this example, though <B> is the node before the insertion and has not changed syntactically, it has gained some children. Additionally, though <A> has not changed syntactically, it has lost some children to the virtual root node (namely </B> and </C>). Thus, the lexer 202 or parser 204 can determine the existence of the new unmatched end-tag </A> in the inserted string and look before <B> for a matching start-tag. After finding <A>, the parser 204 can start parsing from that tag instead of <B> since both have changed structurally. It is to be appreciated that if no matching start-tag had been found (for example, if the tag was </R>), parsing could begin at <B> since <A> would not have changed structurally and <R> would be added as a child to the last starting node, <B>. Additionally, since </B> and <C> have been modified by receiving a new parent, the reparse can extend to these nodes as well. Where more nodes are present, the reparse can continue until a truly unchanged node is reached, for example As mentioned, the aspect of operability with the malformed data strings is advantageous as languages, such as XML, can be difficult to edit while keeping the integrity of the file due to file size, structure, operator error, and the like. It is to be appreciated that the subject matter as described can also comprise an error detection and reporting component (not pictured) for the hierarchical data file. For example, the lexer 202 and parser 204 can output to this file to respectively report both syntactical and structural errors. Additionally, the intelligent error handling with respect to the file language allows the modification event component 406 to report change in the character data or file structure at any time during the edit, and the tree can be updated accordingly (e.g. the components need not wait for the entire edit to take place and finish before updating the tree). It is to be appreciated that the reparsing can occur when a modification event is detect by the modification event component 406; this event can occur at substantially any time during an edit such that the reparsing is performed on a broken string (e.g. malformed according to the language specification or definition) by virtue of the update not yet being complete when it is processed. Thus, multiple reparsings can occur in a single edit session and/or while modifying a single sequential portion of the data string.

Figure 5:
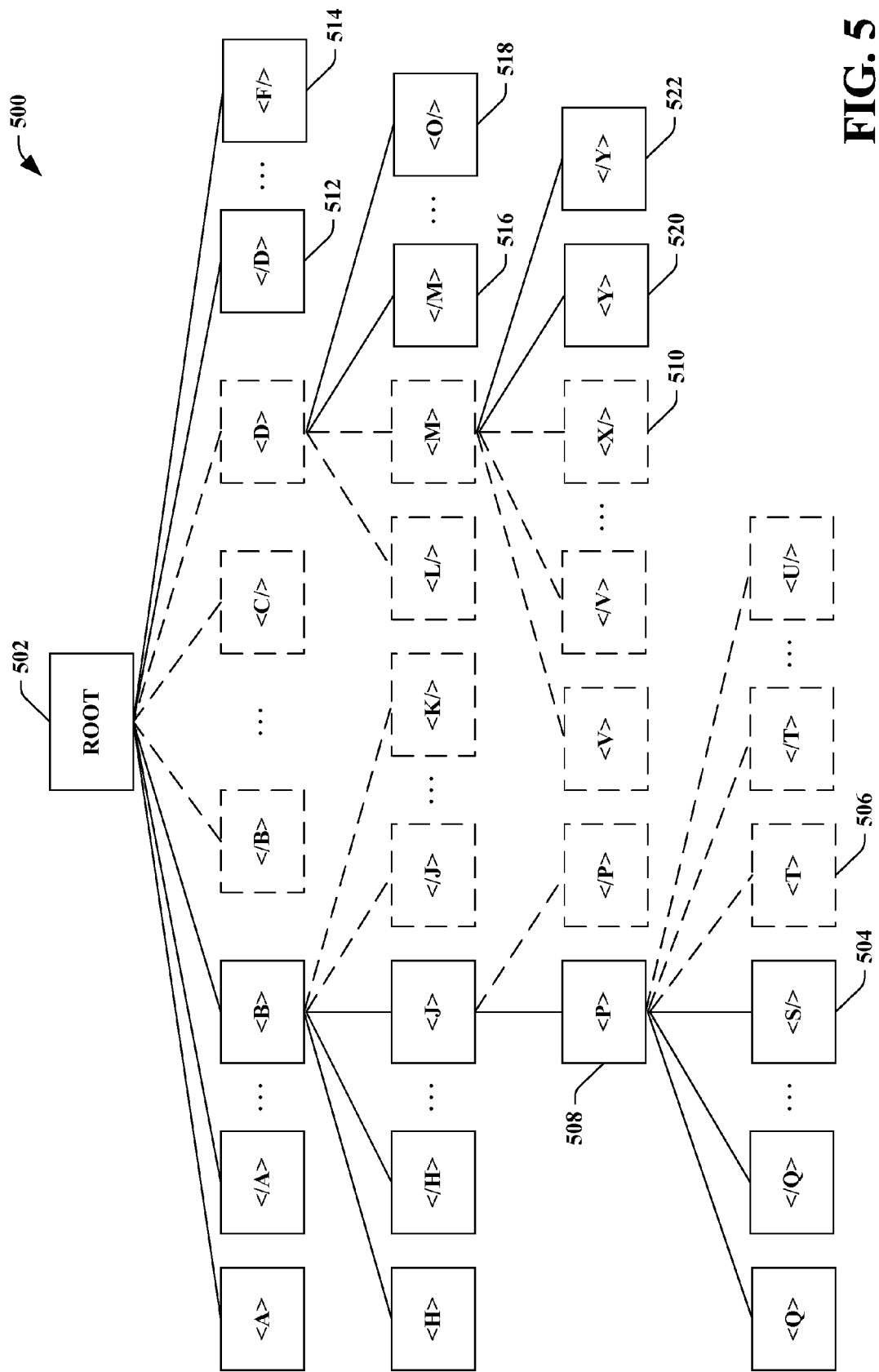
FIG. 5 illustrates a block diagram of an exemplary delete operation on a hierarchical tree.

Referring to FIG. 5, an example XML tree 500 preparing for node deletion is illustrated. The tree 500 can have a virtual root node 502, and a plurality of children nodes spawning hierarchically from the root node. For example, the tree can correspond to an XML character data string such as:

<A></A>...<B><H></H>...<J><P><Q></Q>...<S/><T></T>...<U/></P></J>...
<K/></B>...<C/><D><L/><M><V><V>...
<X/><Y></Y></M>...<O/></D>...<F/>.

And an alternate single character string representation, as described above, can be A$\overline{A}$...B[H$\overline{H}$...J[P[Q$\overline{Q}$...S*T$\overline{T}$...U*]$\overline{P}$]$\overline{J}$...
K*]$\overline{B}$...C*D[L*M[V$\overline{V}$...X*Y$\overline{Y}$]$\overline{M}$...
O*]$\overline{D}$...F*

In this example, a delete of a large portion of the string is desired, as indicated by the dotted-lines in the figure. Deleting the string in an incremental fashion will render a tree comprising some nodes from a left side of a deletion point and some from a right side where nodes in the middle are deleted. In this example, the delete in the string occurs from <T> to <X/>. As shown in previous figures, a modification event component can detect the deletion from the string and send a start and end position to a tree search component; if a subsequent insert occurs (e.g. a replace when taken in aggregate), the new string can be provided as well. The tree search component, as shown in previous figures, can determine the first node (or portion of the node) in the deleted string. In one embodiment, the node immediately preceding the first node to be deleted (in the text string) can be represented by L hereinafter, and the last node (or a portion thereof) in the deleted string, represented by R hereinafter. It is to be appreciated that this deletion can render multiple mismatched end-tags, namely </M> and </D>, as well as some mismatched start-tags, namely <B>, <J>, and <P>. However, as described, the malformations can be intelligently handled to retain operability of the tree and related tree objects.

In this example, L can correspond to <S/> 504 (the node before the node <T> 506 being deleted) and R can correspond to <X/> 510. Thus, deletion of the half-open interval (L, R] is desired; as mentioned, the dotted lines represent the interval for deletion. In this deletion, some of the right nodes will remain though their parent nodes are deleted; thus, these nodes, 512, 514, 516, 518, 520, and 522 can be stored for reinsertion at an appropriate point after the deletion. This point can be, for example, as children of the last start tag before the deletion. However, where the sub-tree of nodes to be reattached comprises an end-tag that becomes matched after reattaching, the nodes after the matched end-tag can become children of the matched end-tag's parent, for example. This will be described in further examples, supra. In the example shown in this figure, deletion of the half-opened interval (L, R] can render the XML string (recall that <S/> 504 is the L-node, but is not deleted, hence, the interval is half-opened):

<A></A>...<B><H></H>...<J><P><Q>
</Q>...<S/><Y></Y></M>...<O/></D>...
<F/>.

And an alternate single character string representation, as described above, can be A$\overline{\text{A}}$...B[H$\overline{\text{H}}$...J[P[Q$\overline{\text{Q}}$...S*Y$\overline{\text{Y}}$M...O*$\overline{\text{D}}$...
F*]]].

Thus, in the tree operation, a hierarchical parser, as shown in previous figures for example, can begin by finding the lowest common ancestor (LCA) of <S/> 504 and <X/> 510 (which is the root node 502 in this case). One way this can be accomplished, for example, is by comparing parent nodes at each level until the first common one is reached. Thus, starting at <S/>'s first parent, <P> 508, a comparison can be made to all of <X/>'s parents. If none match, <P>'s parent can be evaluated in the same regard and on up until a matching node is found. Then, beginning at the R node, siblings subsequent to the R node (to the right of, for example) can be saved in a separate sub-tree before deletion as they are not deleted in the string (they occur later on, after the deletion end point). In this example, these nodes are 520 and 522; after they are saved in the sub-tree, children of R's parent can be deleted. R's parent is traversed next, and similarly, children to the right of R's parent 514 and 516 can be saved in a sub-tree. Subsequently, the children of R's parent's parent are deleted and on up until the LCA is reached. The right most siblings of the ancestor that is a direct child of LCA can also be saved in a sub-tree. Thus, since a full reparse of the string shown above can attach the nodes 512, 514, 516, 518, 520, and 522 as children of the last start node before the deletion (<P> 508 in this case), the incremental parse can do the same. For this reason, the nodes 512, 514, 516, 518, 520, and 522 are kept in the separate sub-trees before they are deleted and can be later re-inserted into the tree. Subsequently, similar actions can occur with respect to the L node. Starting from L, the children of L can be removed. The L ancestors can be traversed until the LCA is reached; at each step, siblings to the right of L's ancestor are deleted from the tree. Once the LCA is reached, another iteration can occur to delete right justified siblings of L's ancestor-child of LCA. The following pseudo-code can be used to delete the appropriate nodes from the tree and store nodes to the right of R and R's ancestors in sub-trees:

```
if (L == R) return;
var LCA = lowest common ancestor of L and R;
var detachedSubtrees = new List<Node>( );
var prevNodeR = null;
var nodeR = R;
// Put right-side siblings of R and R's ancestor in separate
// sub-trees and delete
while (prevNodeR != LCA) {
    // ChildrenAfter(null) returns all children
    detachedSubtrees.Add(nodeR.ChildrenAfter(prevNodeR));
    prevNodeR = nodeR;
    nodeR = nodeR.ParentNode;
}
var prevNodeL = null;
var nodeL = L;
// Delete children of L and right-side siblings of L and L's
// ancestors up to LCA
while (prevNodeL != LCA) {
```

-continued

```
    // RemoveChildrenAfter(null) removes all children
    nodeL.RemoveChildrenAfter(prevNodeL);
    prevNodeL = nodeL;
    nodeL = nodeL.ParentNode;
}
```

As described previously, a replace operation can be processed as a delete operation followed by an insert into the tree. In this case, the insertion can be processed next. In either case, the detached sub-trees can be re-inserted into the tree; in a replace operation, this can be after the insertion occurs, for example. It is to be appreciated that the sub-tree(s) can comprise a plurality of nodes or a single node. The insertion, whether of new nodes in a replace operation and/or of detached nodes from the delete operation, can be inserted as children of the last start tag; this can be L, if it is a start tag, or the first start tag before L. The nodes can simply be appended as children of the last start tag, as can occur in the FIG. 5 example, unless the nodes to be inserted comprise an unmatched end-tag. If this is the case, alternative methods can be employed to insert the nodes since the end-tag unmatched within the inserted string may match to a start-tag already in the present tree, which can change the structure of the tree and the nodes to be inserted.

For example, given the tree A[B$\overline{\text{B}}$C], appending sub-tree D[E[$\overline{\text{A}}$]$\overline{\text{E}}$] (whether by pure insertion or re-inserting of detached sub-trees) can cause the end-tag $\overline{\text{A}}$ to match with the start tag A in the original tree. In this regard, E is a child of A, whereas $\overline{\text{E}}$ can be a child of the virtual root node. One way to handle this can be to separate sub-trees where the unmatched end tag exists. For example, where a sub-tree comprises more than one node where at least one node is an unmatched end tag (unmatched within the sub-tree), the sub-tree can be split into its root node and sub-trees rooted by the children of the root node. For example, the tree A[B[D*]$\overline{\text{B}}$$\overline{\text{C}}$], which has an unmatched end-tag node $\overline{\text{C}}$, can be split into the sub-trees A, B[D*], $\overline{\text{B}}$, and $\overline{\text{C}}$. If after the split some of the resulting sub-trees have unmatched end-tags, those sub-trees can be split again. The affect of this splitting is to have siblings of the unmatched end-tag in separate sub-trees so if the unmatched end-tag matches to a start-tag in the tree, the sub-trees can be attached in the appropriate hierarchy (such that, for example, nodes after the end-tag that matched can be siblings of the end-tag's parent as would happen in a full reparse). The following pseudo-code is an example of one way to achieve this functionality:

```
var preparedSubtrees = new List<Node>( );
// For each new token create a single-node subtree and add it
// to the list
foreach (var token in newTokens) {
    var curNode = new Node(token);
    preparedSubtrees.Add(curNode);
}
// Process subtrees detached by algorithm B
foreach (var subtree in detachedSubtrees) {
    Prepare(subtree);
}
// Process a single subtree
function Prepare(subtree) {
    if (subtree contains unmatched end-tag nodes) {
        // Create a shallow copy of the root node and add it to
        // the list
        var clonedRootNode = subtree.CloneNode(false);
        preparedSubtrees.Add(clonedRootNode);
```

```
            // Recursively process subtrees rooted by all the
            // children
            foreach (var child in subtree.ChildNodes) {
                Prepare(child);
            }
        }
        else {
            preparedSubtrees.Add(subtree);
        }
    }
}
```

It is to be appreciated that this functionality, and the following insertion functionality, can occur both with respect to inserting new nodes and/or reinserting the detached sub-trees during the delete operations.

When inserting the sub-trees in the tree, the last start-tag node (referred to in pseudo-code as lastStartTag), can move higher, as nodes are inserted, than the LCA (for example, where unmatched end-tags are matched). Thus, to mimic full reparse behavior, when the last start tag moves to the next ancestor node, the children of the ancestor to the right of L's ancestor node can be appended to the sub-trees being inserted and deleted from the tree such that the nodes can be re-inserted after the currently inserted nodes. For example, given the string:

<A><B><C></B><D/></A><E/> and thus, the tree A[B[C]$\overline{B}$D*]$\overline{A}$E*, a replacement of <C></B> can be made for </A>, for example (such as in a text and/or XML editor), rendering the string:

<A><B></A><D/></A><E/>.

As described, this can be separated into a delete of <C></B> and an insert of </A>. During the delete, the half-opened interval of (B, $\overline{B}$] can be deleted. Utilizing the algorithm described above, C and $\overline{B}$ are deleted and D* is inserted into a sub-tree; LCA, for the operation, is B. Before the D* sub-tree is re-inserted, the new token </A> can be tokenized into $\overline{A}$ and inserted. Since this is only a one-node sub-tree, the splitting of the tree need not be performed as shown above. It is to be appreciated that if there were other nodes in the sub-tree, the splitting can be performed if </A> was unmatched within the sub-tree, for example. The last start tag in this case is the LCA, <B>; however, since </A> is unmatched, the last start tag can move up to <A> and then to the root node (since <A> is affected by the new matching end-tag). For this reason, the siblings to the right of ancestor-child <A> can be put in a sub-tree appended to the reinsertion sub-trees and deleted from the tree. At this point, the tree can be represented as A[B], with sub-trees $\overline{A}$, D*, and $\overline{A}$E* to be inserted. These can be inserted as children of the last start tag, which is the root node, yielding the tree represented as A[B]$\overline{A}$D*$\overline{A}$E*, which can be the same tree received on a reparse of the entire string (<A><B></A><D/><A><E/>). The following pseudo-code can be used to effectuate this functionality:

```
// Guard is the highest ancestor of L whose children were
// detached and put in the preparedSubtrees list.
var guard = LCA;
// LastStartTag is can be either equal to guard, or a
// descendant of guard
var lastStartTag = L;
// Find the last unclosed start-tag node before or equal to L
if (L.Kind != NodeKind.StartTag && L.Kind != NodeKind.Root) {
    lastStartTag = ParentNode(L);
}
while (preparedSubtrees.Count > 0 ||
    lastStartTag != guard && guard != rootNode)
{
    while (preparedSubtrees.Count == 0 && guard != rootNode) {
        // Move the guard pointer higher up the tree
        ParentNode(guard);
    }
    foreach (var curNode in preparedSubtrees) {
        if (curNode.Kind == NodeKind.EndTag) {
            // A single end-tag node subtree. Find the nearest
            // ancestor start-tag with the same name.
            for (var startTag = lastStartTag;
                    startTag != rootNode;
                    startTag = ParentNode(startTag)) {
                if (startTag.Name == curNode.Name) {
                    lastStartTag = ParentNode(startTag);
                    break;
                }
            }
        }
        lastStartTag.AppendChild(curNode);
        if (curNode.Kind == NodeKind.StartTag)
            lastStartTag = curNode;
    }
}
// Return the parent node and update the guard node
// and the preparedSubtrees list if needed.
function ParentNode(node) {
    var parent = node.ParentNode;
    if (node == guard) {
        foreach (var child in parent.ChildrenAfter(guard)) {
            Prepare(child);
        }
        parent.RemoveChildrenAfter(guard);
        guard = parent;
    }
    return parent;
}
```

Thus, even though some of the foregoing examples produce syntactically invalid trees (as there are unmatched start/end tag nodes), the subject matter as described can intelligently handle these errors, instead of just breaking or merely producing an error, and do so while still having the ability to incrementally parse the text string.

The aforementioned systems, architectures and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, as will be appreciated, various portions of the disclosed systems and methods may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ).

Such components, inter alia, can automate certain mechanisms or processes performed thereby to make portions of the systems and methods more adaptive as well as efficient and intelligent, for instance by inferring actions based on contextual information. By way of example and not limitation, such mechanism can be employed with respect to generation of materialized views and the like.

Figure 6:
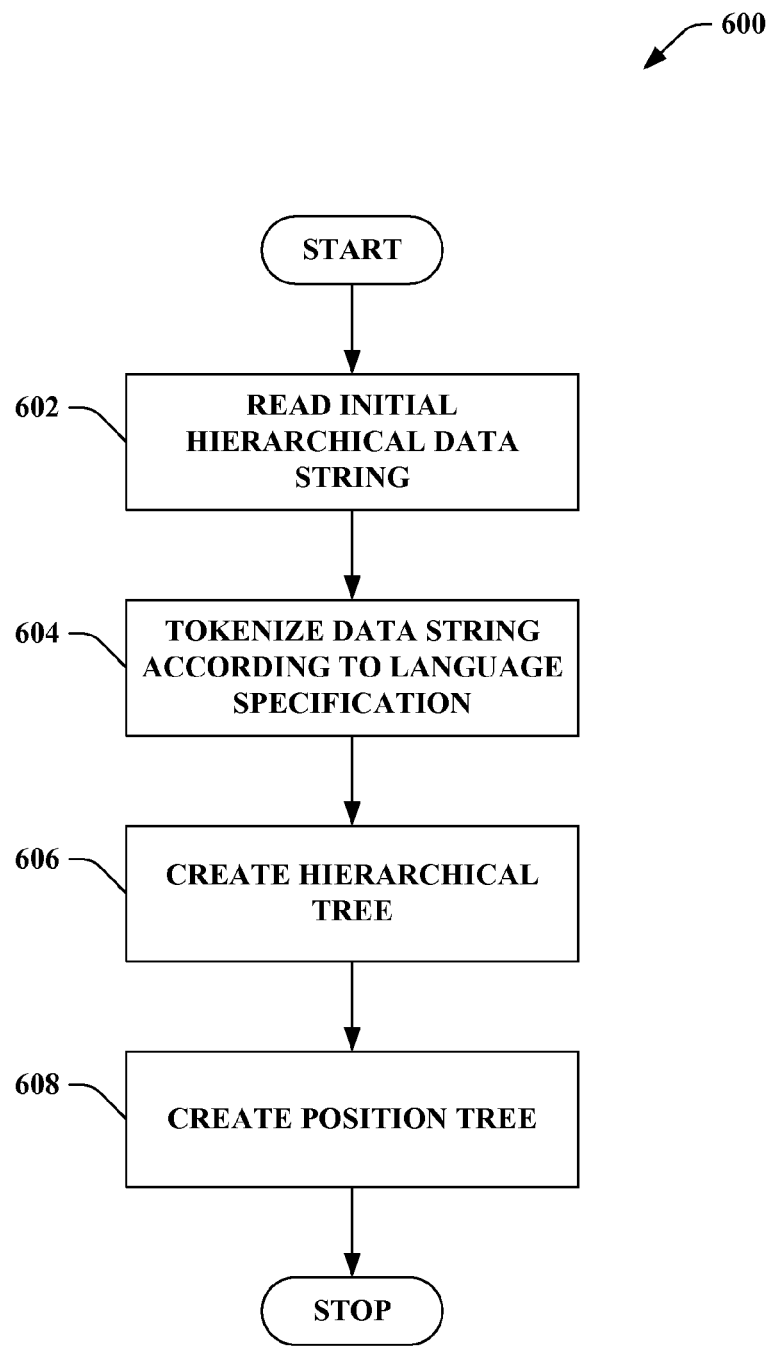
FIG. 6 illustrates an exemplary flow chart for creating trees from a data string.
Figure 7:
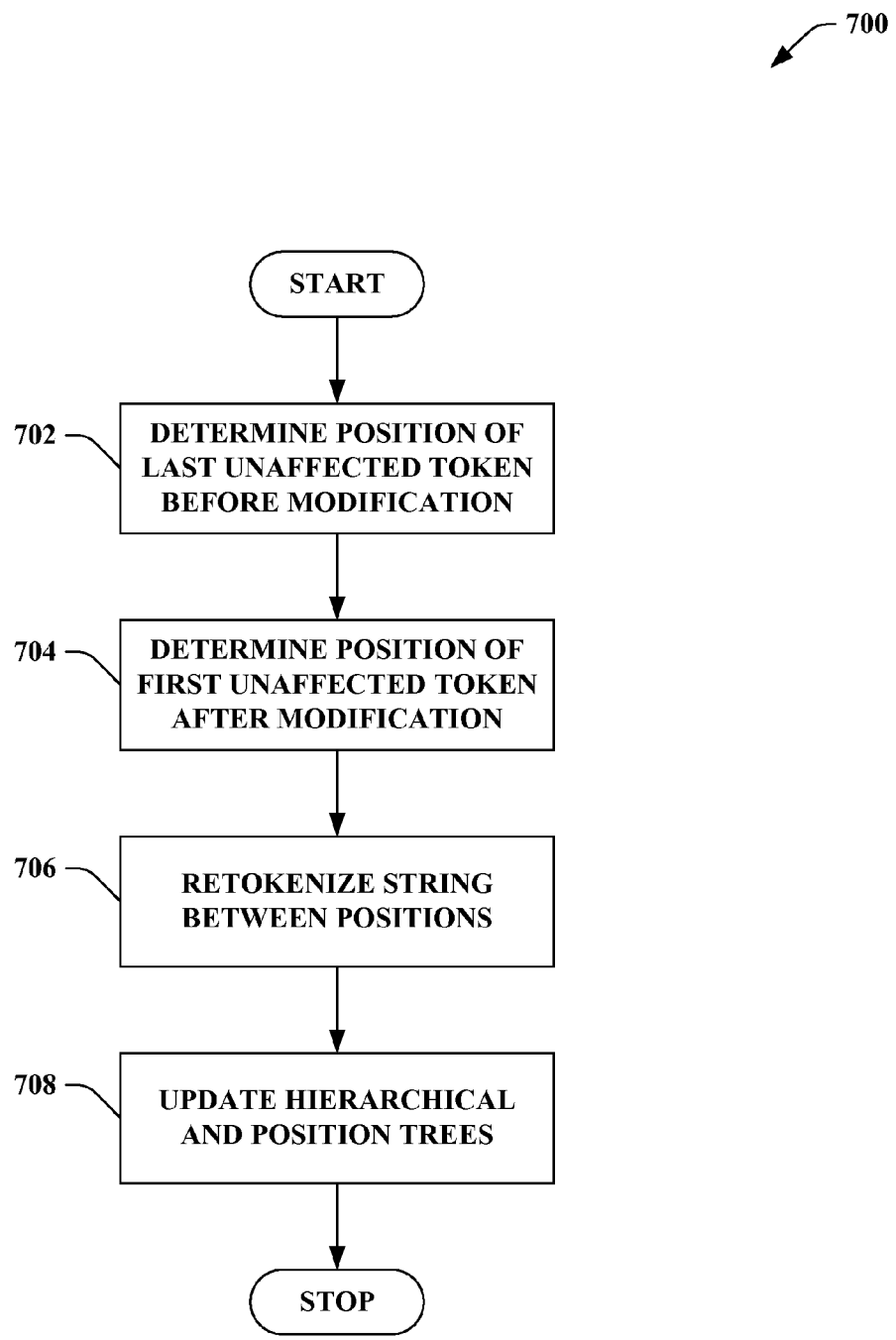
FIG. 7 illustrates an exemplary flow chart for incrementally updating a tree according to an update to a related data string.
Figure 8:
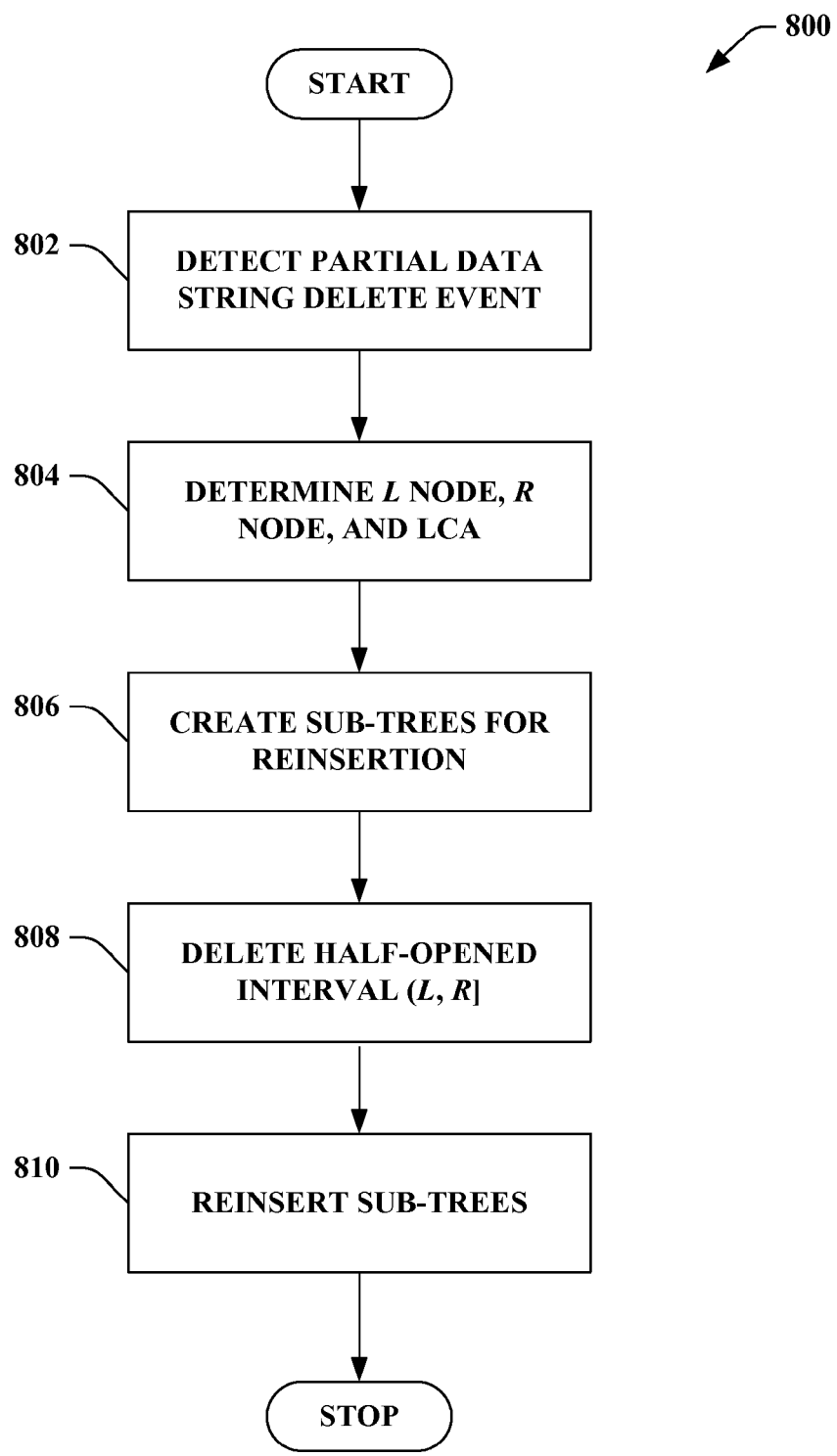
FIG. 8 illustrates an exemplary flow chart for deleting a portion of a tree according to a delete on a related data string.

In view of the exemplary systems described supra, methodologies that may be implemented in accordance with the disclosed subject matter will be better appreciated with reference to the flow charts of FIGS. 6-8. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 6 shows a methodology 600 for initially parsing a hierarchically formatted string into a representative tree structure. At 602, the hierarchical data string is read; this can be substantially any hierarchically formed string including XML, tab-delimited file (such as program source code, for example), object-oriented program representation (such as a data flow or modeling concept diagram, for example), and the like. At 604, the string can be tokenized according to a language specification. For example, if the string is XML, it can be broken into a plurality of elements representing the different structures and values of the file. If tab-delimited, for example, each tab and/or carriage return, can represent the beginning of a new token, for example. It is to be appreciated that minor errors in syntax can be intelligently handled at this step using heuristics or other inference/artificial intelligence based schemes, for example. In one embodiment, if an end quote is forgotten in an XML document and the tags after a certain point appear to relate to tags before the quote began, the disclosed subject matter can infer this state and appropriately place the missing end quote, for example.

At 606, a hierarchical tree is created from the data string. The tree can be an in memory representation of the tree, such as those described herein, a picture, and the like. The tree can correspond to the data string having substantially the same hierarchical structure. Errors in the hierarchical structure of the data string can be intelligently handled in creating the tree such that a minor error need not break the entire tree or prevent further parsing/utilization. In this regard, end-nodes missing starting-nodes can be forcedly matched with the nearest ancestor start-tag. If no matching ancestor start-tag exists, the end-tag can be left unmatched and can be appended as a last child of the last unclosed start-tag node. This is one embodiment; other schemes are possible so long as the error in structure is intelligently handled to allow further processing of the hierarchical data string. At 608, a position tree is created comprising the plurality of nodes in the hierarchical tree and related positions within the data string. It is to be appreciated that this tree can be the same as the hierarchical tree where the hierarchical tree comprises position information, for example. The position information can be later utilized in edit operations to the string and incrementally amending the tree to reflect the changes.

FIG. 7 illustrates a methodology 700 that facilitates propagating a modification on a hierarchical data string to a representative tree. At 702, the position of the last unaffected token before the modification is detected. It is to be appreciated that the unaffected state relates to the token data including its inheritance data. Thus, if an end-tag is deleted, the start-tag to which it relates can be inherently affected such that the last unaffected token is at least before that start-tag. Similarly, the first unaffected token after the modification is determined. In this regard, for example, if a modification to the string ends with a start-tag, the tags following the insertion are affected unless or until a matching end-tag is reached.

Once the two positions are determined, at 706 the string between the two positions in the data string is retokenized. The tokens can be created according to a language specification, as described above for example. At 708, the hierarchical and position trees are updated to reflect the change. As described supra, to update the hierarchical tree, a modification point on the tree can be determined by detecting the node with the position of the last unaffected node before the modification by looking at the position tree. Similarly, the position in the tree of the first unaffected token after the modification can be detected. Subsequently, the modification can occur on the hierarchical tree between the determined nodes (whether it be deletion, insertion, and/or both). The position tree can also be updated to reflect the new positions of the tokens in the string subsequent modification.

FIG. 8 shows a methodology 800 for propagating a deletion of a portion of nodes in a data string to a representative tree. In this embodiment, at 802 the deletion in the string event is detected. It is to be appreciated that a text editor or other user interface can be used to change the data string, and the change can be detected; information regarding the change is captured. Additionally, the string can be modified programmatically, for example. At 804, in accordance with algorithms and pseudo-code shown above, the L node is determined. It is to be appreciated that this can be the last token untouched by the delete. Similarly, the R token is determined, which can be the last deleted token in the string. When these nodes have been determined, the lowest common ancestor can be detected by finding the lowest node in the tree that is a common ancestor to L and R. With this information, the delete can proceed in this embodiment.

At 806, sub-trees are created for later re-insertion into the tree. The sub-trees can comprise sibling nodes to the right of R in the tree. These nodes are not part of the interval to be deleted—the half-opened interval (L, R]—however, their parent nodes need to be deleted. Thus, these nodes are placed in a sub-tree. Similarly, sibling nodes to the right of R's ancestors are placed in sub-trees since their parent will be deleted. This can occur for the nodes up until the LCA. Sibling nodes of R's ancestor-child of LCA can be stored in sub-trees as well. At 808, the half-opened interval is deleted. This can start with L's children and on to the L's right-hand sibling nodes, for example. L's ancestors' right-hand sibling nodes can be deleted as well on up to the LCA. In addition, right-hand siblings of L's ancestor-child of LCA can be deleted. This can include R (and all children thereof) as well as siblings to the right of R as well (recall these can be saved in sub-trees). At 810, the sub-trees can be reinserted into the tree. It is to be appreciated that if the operation was a replace, the added nodes can be inserted before the re-inserted nodes. Additionally, where the sub-trees comprise unmatched start tags, algorithms as shown above can be used to ensure the resulting tree is substantially similar to the tree represented by the entirely reparsed data string.

As used herein, the terms "component," "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance or illustration. Any aspect or design described herein as "exemplary" is not necessarily to be construed as preferred or advantageous over other aspects or designs. Furthermore, examples are provided solely for purposes of clarity and understanding and are not meant to limit the subject innovation or relevant portion thereof in any manner. It is to be appreciated that a myriad of additional or alternate examples could have been presented, but have been omitted for purposes of brevity.

Furthermore, all or portions of the subject innovation may be implemented as a method, apparatus or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD). . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 9:
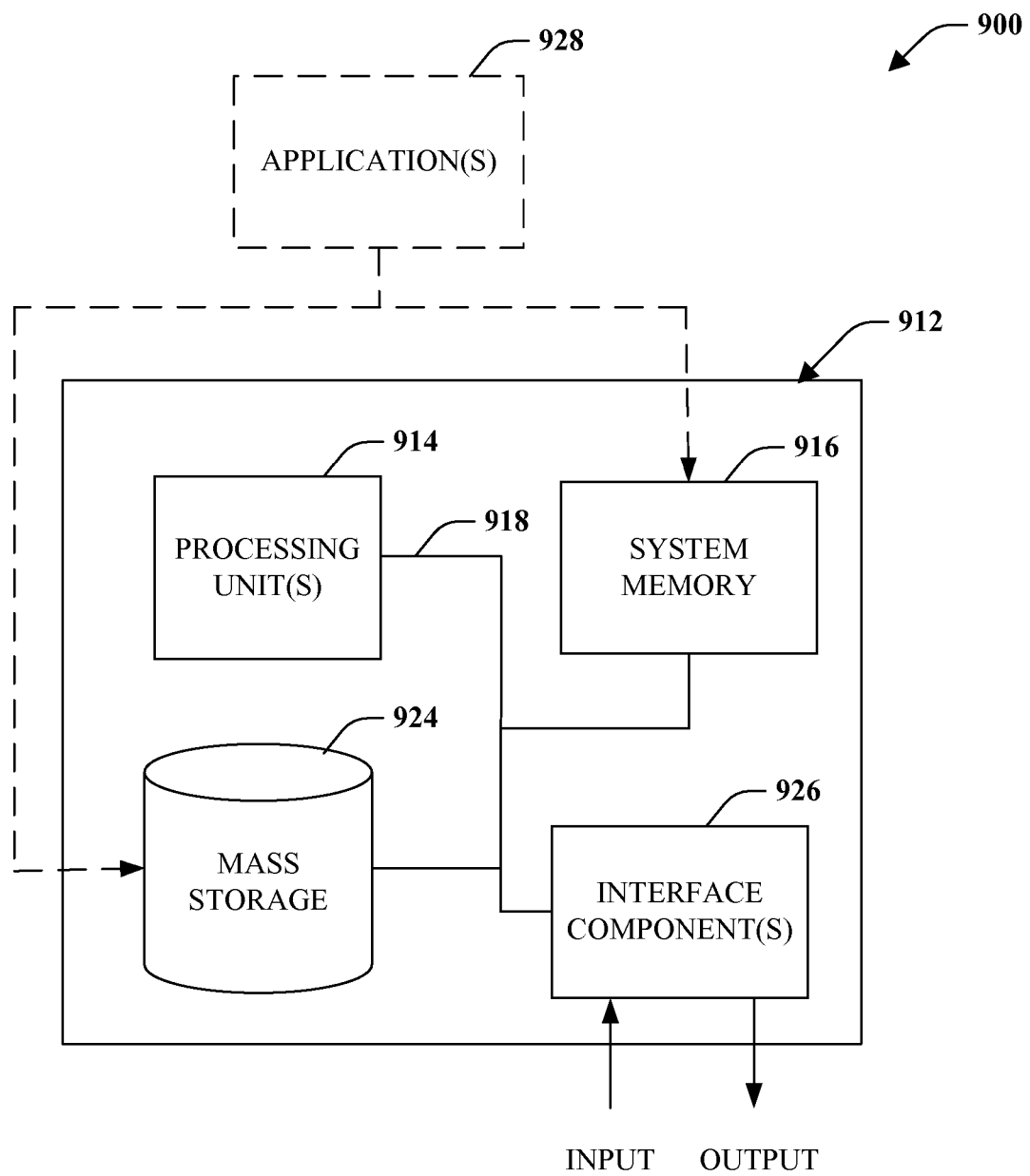
FIG. 9 is a schematic block diagram illustrating a suitable operating environment.
Figure 10:
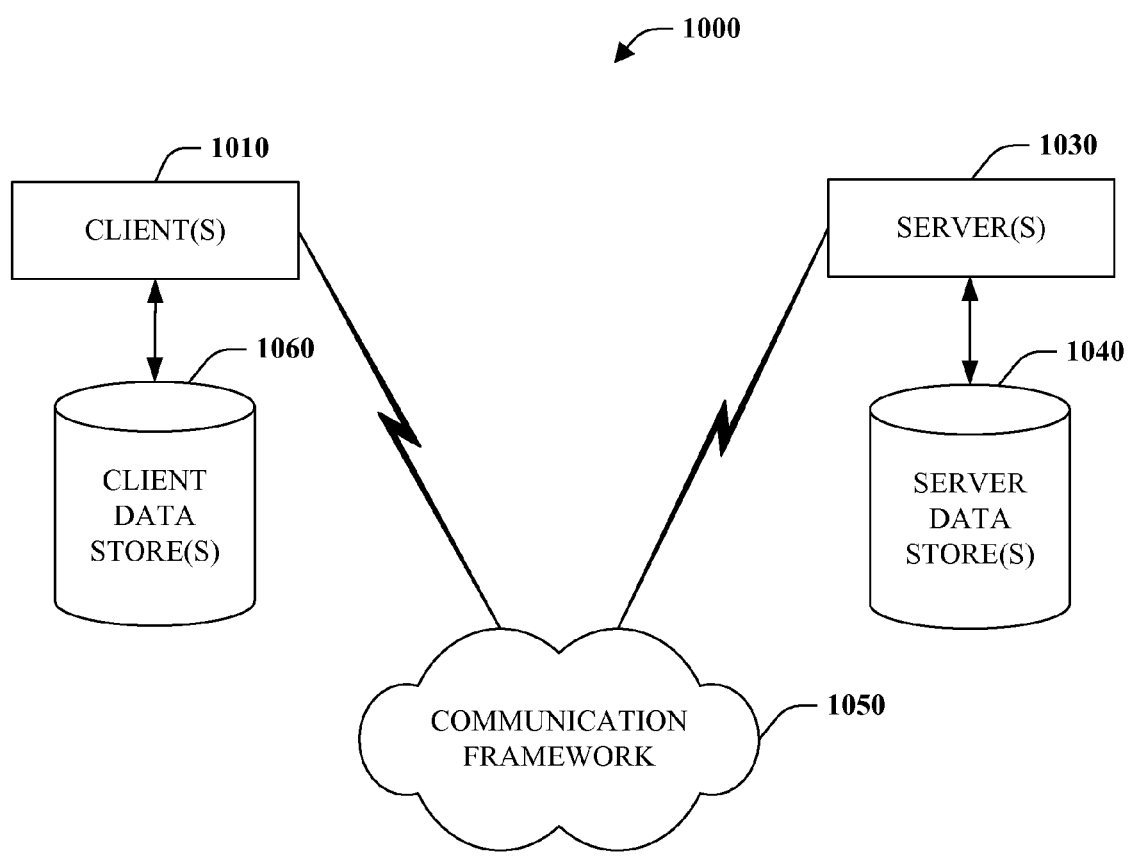
FIG. 10 is a schematic block diagram of a sample-computing environment.

In order to provide a context for the various aspects of the disclosed subject matter, FIGS. 9 and 10 as well as the following discussion are intended to provide a brief, general description of a suitable environment in which the various aspects of the disclosed subject matter may be implemented. While the subject matter has been described above in the general context of computer-executable instructions of a program that runs on one or more computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the systems/methods may be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed subject matter can be practiced on stand-alone computers. In a distributed computing environment, program modules may be located in both local and remote memory storage devices.

With reference to FIG. 9, an exemplary environment 900 for implementing various aspects disclosed herein includes a computer 912 (e.g., desktop, laptop, server, hand held, programmable consumer or industrial electronics . . . ). The computer 912 includes a processing unit 914, a system memory 916 and a system bus 918. The system bus 918 couples system components including, but not limited to, the system memory 916 to the processing unit 914. The processing unit 914 can be any of various available microprocessors. It is to be appreciated that dual microprocessors, multi-core and other multiprocessor architectures can be employed as the processing unit 914.

The system memory 916 includes volatile and nonvolatile memory. The basic input/output system (BIOS), containing the basic routines to transfer information between elements within the computer 912, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 912 also includes removable/non-removable, volatile/non-volatile computer storage media. FIG. 9 illustrates, for example, mass storage 924. Mass storage 924 includes, but is not limited to, devices like a magnetic or optical disk drive, floppy disk drive, flash memory or memory stick. In addition, mass storage 924 can include storage media separately or in combination with other storage media.

FIG. 9 provides software application(s) 928 that act as an intermediary between users and/or other computers and the basic computer resources described in suitable operating environment 900. Such software application(s) 928 include one or both of system and application software. System software can include an operating system, which can be stored on mass storage 924, that acts to control and allocate resources of the computer system 912. Application software takes advantage of the management of resources by system software through program modules and data stored on either or both of system memory 916 and mass storage 924.

The computer 912 also includes one or more interface components 926 that are communicatively coupled to the bus 918 and facilitate interaction with the computer 912. By way of example, the interface component 926 can be a port (e.g., serial, parallel, PCMCIA, USB, FireWire . . . ) or an interface card (e.g., sound, video, network . . . ) or the like. The interface component 926 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer and the like. Output can also be supplied by the computer 912 to output device(s) via interface component 926. Output devices can include displays (e.g., CRT, LCD, plasma . . . ), speakers, printers and other computers, among other things.

FIG. 10 is a schematic block diagram of a sample-computing environment 1000 with which the subject innovation can interact. The system 1000 includes one or more client(s) 1010. The client(s) 1010 can be hardware and/or software (e.g., threads, processes, computing devices). The system 1000 also includes one or more server(s) 1030. Thus, system 1000 can correspond to a two-tier client server model or a multi-tier model (e.g., client, middle tier server, data server), amongst other models. The server(s) 1030 can also be hardware and/or software (e.g., threads, processes, computing devices). The servers 1030 can house threads to perform transformations by employing the aspects of the subject innovation, for example. One possible communication between a client 1010 and a server 1030 may be in the form of a data packet transmitted between two or more computer processes.

The system 1000 includes a communication framework 1050 that can be employed to facilitate communications between the client(s) 1010 and the server(s) 1030. Here, the client(s) 1010 can correspond to program application components and the server(s) 1030 can provide the functionality of the interface and optionally the storage system, as previously described. The client(s) 1010 are operatively connected to one or more client data store(s) 1060 that can be employed to store information local to the client(s) 1010. Similarly, the server(s) 1030 are operatively connected to one or more server data store(s) 1040 that can be employed to store information local to the servers 1030.

By way of example, one or more clients 1010 can desire to modify hierarchical data stored on server 1030. Modification requests can come by way of communication framework 1050, for example. The data string can be stored in data store 1040 of the server 1030 along with a tree representation. Requests to modify the data string from clients 1010 affect the tree representation. Additionally or alternatively, the clients 1010 can keep a local cache of the tree in data store 1060. Updates to the data string stored in data store 1040 on server 1030 can be propagated to the client 1010 data store 1060 by way of the communication framework 1050, for example.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" or variations in form thereof are used in either the detailed description or the claims, such terms are intended to be inclusive in a manner similar to the term "comprising" as "comprising" is interpreted when employed as a transitional word in a claim.

What is claimed is:

1. A computer-implemented method for maintaining a hierarchical tree representation of an extensible markup language (XML) data string, comprising using at least one processor coupled to a memory to perform the following operations:
   detecting a modification to an XML data string;
   determining a location of the modification in the XML data string;
   correlating the location of the modification to at least one node in a hierarchical tree formed as a tokenized representation of the XML data string;
   deleting a portion of the hierarchical tree based at least in part on the modification corresponding to deleting a portion of the XML data string;
   determining a last node in the deleted portion of the hierarchical tree, and populating at least one sub-tree with nodes associated with the last node in the deleted portion of the hierarchical tree; and
   inserting the at least one sub-tree into the hierarchical tree following the deleting the portion of the hierarchical tree.

2. The computer-implemented method of claim 1, further comprising determining a smallest number of nodes of the hierarchical tree to be updated as a result of the modification to the XML data string.

3. The computer-implemented method of claim 1, further comprising incrementally reparsing a portion of the hierarchical tree based at least in part on the modification to the XML data string.

4. The computer-implemented method of claim 3, wherein the incremental reparsing comprises producing a tree substantially similar to a tree produced by a full reparsing of the modified XML data string.

5. The computer-implemented method of claim 3, further comprising rendering the XML data string incorrectly formatted as a result of the modification.

6. The computer-implemented method of claim 1, further comprising locating a common ancestor of at least two nodes, one node of the at least two nodes representing a node before a first node deleted in the deleting the portion of the XML string, and another node of the at least two nodes representing a last node deleted in the deleting the portion of the XML data string.

7. The computer implemented method of claim 1, further comprising:
   processing an update to the XML data string, the update rendering the XML string invalid according to an XML language specification; and
   modifying a portion of the hierarchical tree based at least in part on the update.

8. The computer-implemented method of claim 1, further comprising:
   determining a span of the hierarchical tree corresponding to the modification;
   tokenizing a portion of the XML data string corresponding to the span; and
   updating the hierarchical tree based on the tokenized portion.

9. The computer-implemented method of claim 1, further comprising creating a position tree including positional information corresponding to the XML data string.

10. The computer-implemented method of claim 9, further comprising searching the position tree to locate a node corresponding to the modification.

11. A system comprising:
    a processor; and
    instructions stored on a machine-readable storage medium coupled to the processor, the instructions executable by the processor to implement
    an incremental hierarchical parser configured to tokenize a file to form a hierarchical tree representing the file, and
    a modification event component configured to detect a modification of the file;
    wherein the incremental hierarchical parser is further configured to
    delete a portion of the hierarchical tree based at least in part on the modification corresponding to deleting a portion of the file;
    determine a last node in the deleted portion of the hierarchical tree, and populate at least one sub-tree with nodes associated with the last node in the deleted portion of the hierarchical tree; and
    insert the at least one sub-tree into the hierarchical tree following the deletion of the portion of the hierarchical tree.

12. The system of claim 11, further comprising a tree search component configured to search the hierarchical tree based on the modification.

13. The system of claim 12, further comprising a position identification tree searchable by the tree search component, the position identification tree including a plurality of nodes representing tokens corresponding to character data in the file, the nodes storing positional information.

14. The system of claim 12, wherein the incremental hierarchical parser is configured to tokenize a character string corresponding to a range of nodes of the hierarchical tree affected by the modification.

15. The system of claim 12, wherein the incremental hierarchical parser is configured to update the hierarchical tree if the modification creates an error in the file.

16. The system of claim 12, wherein the error includes at least one of a mismatched end tag or a missing start tag.

* * * * *